United States Patent [19]

Johnson et al.

[11] Patent Number: 4,543,994
[45] Date of Patent: Oct. 1, 1985

[54] RIGID MOUNT COUPLER

[75] Inventors: Lyle R. Johnson, Minneapolis; Eugene H. Herzan, Minnetonka, both of Minn.

[73] Assignee: Parker-Hannifin Corporation, Cleveland, Ohio

[21] Appl. No.: 450,890

[22] Filed: Dec. 20, 1982

[51] Int. Cl.⁴ ............................................. F16L 37/00
[52] U.S. Cl. .................... 137/614.04; 137/614.05; 285/315
[58] Field of Search ............. 137/614, 614.03, 614.04; 251/149.6, 149.7; 285/306, 315

[56] References Cited

U.S. PATENT DOCUMENTS

| Re. 23,925 | 1/1955 | Smisko et al. | 137/614.03 |
|---|---|---|---|
| 2,800,343 | 7/1957 | Ulrich | 137/614.04 |
| 3,023,030 | 2/1962 | Torres | 251/149.7 X |
| 3,036,595 | 5/1962 | Rogers | 251/149.6 X |
| 3,086,747 | 4/1963 | Saner | 251/149.7 |
| 3,163,178 | 12/1964 | Stratman | 137/614 |
| 3,215,161 | 11/1965 | Goodwin et al. | 137/614.04 |
| 3,267,963 | 8/1966 | Hupp | 137/614.04 |
| 3,348,575 | 10/1967 | Simak | 137/614.04 |
| 3,490,491 | 1/1970 | Kopaska | 137/614.05 |
| 3,530,887 | 9/1970 | Stratman | 137/614.05 |
| 3,646,964 | 3/1972 | Stratman | 137/614.03 |
| 3,791,411 | 2/1974 | Bogeskov et al. | 137/614.02 |
| 3,964,771 | 6/1976 | Baudouin | 285/315 |
| 4,222,411 | 9/1980 | Herzan et al. | 137/614.04 |
| 4,444,223 | 4/1984 | Maldavs | 285/316 |

Primary Examiner—A. Michael Chambers
Assistant Examiner—John C. Fox
Attorney, Agent, or Firm—Joseph B. Balazs

[57] ABSTRACT

A rigid mount coupler in which all movement required for connecting and disconnecting the nipple occurs within the coupler housing. A body member which receives the valved nipple slides within the housing to actuate a locking mechanism to retain the nipple. The body member supports the coupler valve in a spring loaded retainer so that coupler and nipple valves engage and are balanced in valve open positions. A second spring loaded device supports the coupler valve at the open position and resists further opening movement, thereby preventing flow checking at the nipple. Seals between the body member and housing isolate a stepped chamber therebetween in fluid communication with an inner chamber closed by the coupler valve. The volume of the stepped chamber changes upon movement of the body member and is dimensioned to correspond inversely to changes in volume of the inner chamber to prevent a fluid lock condition.

3 Claims, 3 Drawing Figures

RIGID MOUNT COUPLER

BACKGROUND OF THE INVENTION

This invention relates to fluid couplers, and more particularly to a rigid mount coupler for releasably connecting high pressure conduits when at least the conduit connected to the nipple is pressurized.

Prior art couplers for this purpose include a valved body on one of the conduits and a valved nipple on the other conduit. Typically the valved body is supported within a housing and the housing in turn is resiliently supported within a collar. The collar is fixed to a tractor, for example, and receives fluid under pressure from a power source on the tractor by way of a shutoff valve. In devices such as this, there is relative motion between the body and collar in order to attain coupling with, for example, an implement connected by way of hose terminating in a nipple. Therefore, it is also necessary to use hose between the tractor and the valved body of the coupler in order to accommodate such movement. In many applications there are severe space limitations on a tractor which are further exacerbated by the need to allow room for hose or coupler movement. It is typical in such applications that pressure and return conduits be provided for each implement powered by the tractor, resulting in a great number of hoses and couplers.

Also typical of prior art devices are couplers which require the use of two hands in order to achieve coupling. Usually, an external collar is provided for this purpose which cooperates with a ball locking mechanism or the like. Such external collar must be retracted to allow the nipple to be inserted in the coupler, with spring return of the collar securing the balls and thus the nipple. Typically in devices of this type, and particularly for agricultural implements, a breakaway coupler must be provided to allow automatic disconnection upon receiving a force at the nipple. Also valves are usually employed in both the nipple and coupler to prevent the loss of fluid.

Prior art couplers which include valved nipples and valved bodies and some or all of the features mentioned are shown in U.S. Pat. Nos. 4,222,411, 3,530,887 and 3,163,178.

SUMMARY OF THE INVENTION

The present invention provides a coupler in which valving and the coupling mechanism is contained within the coupler housing and no movement of the housing is required. This allows the coupler to be fixed in relation to a tractor, for example, and thus may be mounted to rigid conduit leading from the tractor power source. In this invention fluid communication is made between the housing and a relatively movable body member contained therein. Since the body member is sealed by a coupler valve, accommodation must be made for fluid trapped therein and this is provided in a sealed step chamber between the body member and housing. The step chamber is dimensioned so that changes in volume thereof upon relative movement between body member and housing, correspond to the changes of volume of the chamber trapped by the coupler valve. Fluid communication is provided by a transverse bore in the body member between the chambers.

A typical ball locking mechanism is utilized to secure the nipple in the coupler, the lock being disengaged when the body member is in an outward position with respect to the housing and engaged when in an inner position. Movement of the body member between inner and outer positions is effected solely by engagement with the valved nipple. A detent is provided at both of these positions to assist in securing the nipple. However a triple seal arrangement between the body and housing assures a balance of fluid pressures on the body member or at least a bias toward the coupled position to assist in retaining the nipple. Two of these seals are used as the seals for the step chamber previously mentioned.

Both the nipple and coupler include valves therein to prevent loss of fluid and both may be spring loaded valves which engage each other and, once pressures are equalized within the coupler, hold each other in a balanced valve open position in relation to their respective valve seats. A flow check mechanism is also provided to prevent lockup of the nipple valve upon sudden flow surges from the implement. The flow check is a spring-loaded pin which is supported in the body member and is limited in its axial travel to directly engage the coupler valve when it is approximately at its open position in balance with the nipple valve. Further opening movement is resiliently resisted by the pin, thus preventing closure and lockup of the nipple valve.

The flow check mechanism also provides a function during coupling of an implement under pressure. Positioning of the nipple within the entrance to the body member during movement of the body member to the coupled position causes the fluid-locked nipple valve to engage the coupler valve and move the latter into engagement with the spring loaded pin. The spring biasing the pin is stronger than the nipple valve spring so that once the body member is pressurized by opening of a control valve, the hydraulic face seating the nipple valve is overcome and the springs take over, causing further opening of the nipple valve and return of both valves to the balanced position.

The coupler of the invention provides this mechanism in a substantially straight bore configuration so that fluid flow is along the axis of the coupler, resulting in minimal pressure drop.

DETAILED DESCRIPTION OF THE DRAWINGS

Figure 1:
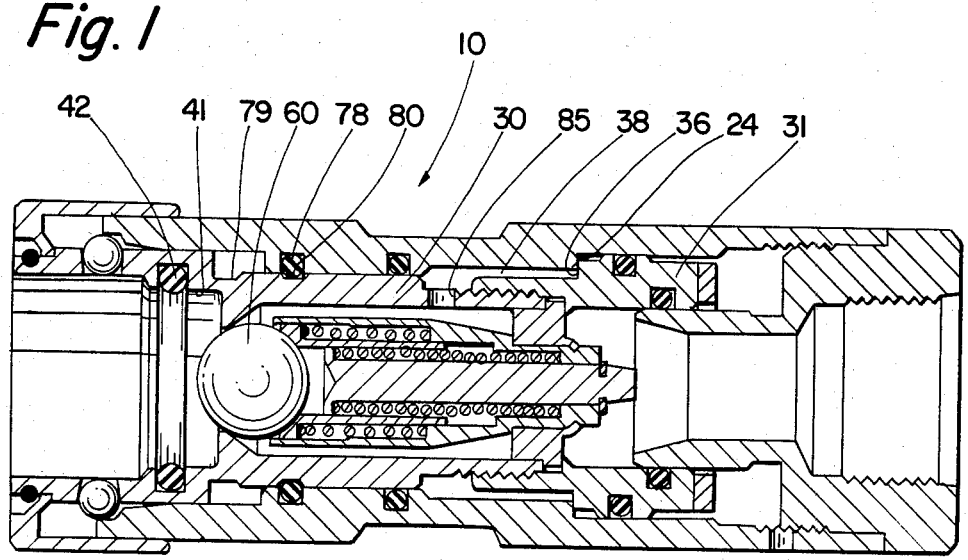
FIG. 1 is a cross-sectional side view of the coupler in uncoupled configuration.

Referring now to the drawings in greater detail, there is shown a coupler 10 which includes coupler housing 11, telescoping body member 12 and nipple 13.

The housing 11 includes cylindrical main housing 14 and fitting 15 in threaded connection at one end thereof. The housing 11 includes entrance bore 16 and further inner bores 18–21, having shoulders 22–25 therebetween. Fitting 15 includes tubular section 26 at one end and internally threaded bore 28 at the other end in communication with one another and providing fluid communication to the interior of housing 11.

Body member 12 consists of generally cylindrical main body 30 of stepped diameters to be slidably received in bores 16, 18 of housing 11, and tubular piston 31 in threaded connection at the axially inner end thereof. First o-ring seal 32 is received in a groove at the ID of piston 31, the latter sized to slide over the OD of tubular section 26 of fitting 15 for sealed support of the inner end of body member 12.

Piston 31 is stepped having outer surfaces 34, 35 with shoulder 36 therebetween. The surfaces 34, 35 and bores 19, 20 of housing 11 form a variable volume annular chamber 38, sealed at either end by second and third o-ring seals 39, 40, received respectively in a groove in the bore 18 of housing 11 and in a groove in the outer surface 35 of piston 31.

Figure 2:
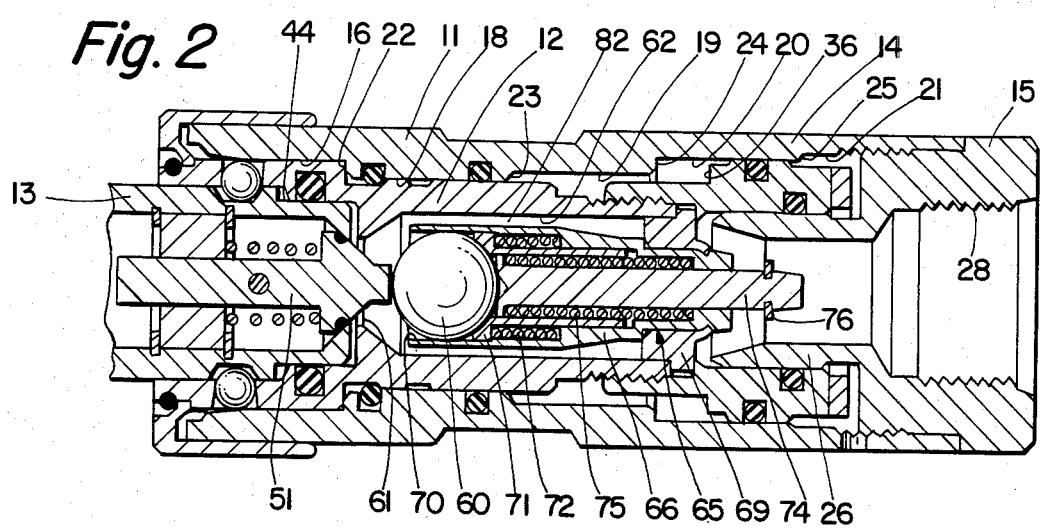
FIG. 2 is a cross-sectional side view of the coupler with a nipple under pressure inserted to the coupled position.
Figure 3:
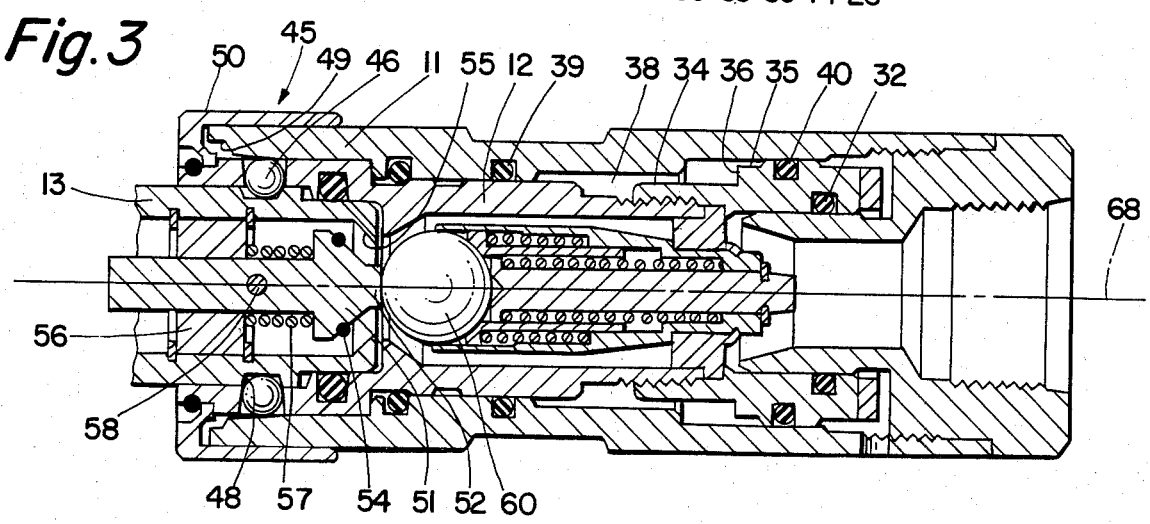
FIG. 3 is a view similar to FIG. 2 after the nipple valve is opened and the coupler and nipple valve are in a balanced open position.

Body member 12 further includes entrance bore 41 having o-ring seal 42 therein adapted for sliding receipt of the cylindrical nose portion 44 of nipple 13. The body member 12 carries a locking device 45 at its axially outer end for releasably retaining nipple 13 in the body member 12. The locking device 45 is a well known mechanism consisting of a circular array of locking balls 46 retained in radial holes in body member 12, cammed radially inwardly by bore 16 of housing 11 into groove 48 on the OD of nipple 13 when the body member 12 is moved to its axially inward position as depicted in FIGS. 2 and 3. In the axially outward position of body member 12 depicted in FIG. 1, locking balls 46 are moved radially outwardly into recess 49 at the entrance to bore 16 to allow release of nipple 13. A locking collar 50 is provided to allow for manual movement of body member 12, however as will be described in greater detail, this is ordinarily not required as coupling and uncoupling is usually achieved by interengagement between the nipple 13 and body member 12.

Nipple 13 is conventional and includes conical nipple valve 51 having cylindrical projection 52 and o-ring seal 54 engageable with seat 55 formed within the nose portion 44. Nipple valve 51 is adapted for axial sliding movement in mount 56 and is normally biased by spring 57 into engagement with valve seat 55. A stop pin 58 prevents excessive movement of nipple valve 51 by engagement with mount 56, thereby serving as a flow check device.

Body member 12 further includes coupler valve 60 therein which cooperates with transversely oriented circular coupler valve seat 61, as seen in FIG. 1, to close one end of inner bore 62 of the body member 12. Coupler valve 60 is a hardened steel ball and is spring loaded to seat on the hardened metal or elastomeric seat 61, acting as a typical poppet type valve. Coupler valve 60 is guided axially toward and away from valve seat 61 by a resilient support 65 which includes a flow check mechanism therein.

The coupler valve support 65 consists of a generally cylindrical support 66 coaxially disposed on the axis 68 of the coupler 10, retained in collar 69, the latter having a shoulder thereon trapped between main body member 30 and piston 31, for movement with body member 12. Coupler valve 60 is slidably received in first bore 70 of support 66, being urged toward valve seat 61 by means of valve guide 71 and valve spring 72, the latter acting between a shoulder in support 66 and the valve guide 71. Valve guide 71 is of tubular configuration and is received in a counterbore in support 66. A flow check mechanism is also contained in support 66, consisting of axially slidable pin 74, biased toward engagement with coupler valve 60 by means of flow check spring 75, the latter received in a further counterbore in support 66. A stop consisting of clip 76 is received in a groove at one end of pin 74 to limit axially outward movement of pin 74 to the position depicted in FIGS. 1 and 3.

A detent mechanism consisting of o-ring 78 trapped in housing 11 and outer and inner grooves 79, 80 in body member 12 provides a device for restraining movement of body member 12 at its axially inner and outer positions, respectively.

Referring now particularly to FIG. 1, the coupler 10 is shown in the disconnected condition prior to receipt of nipple 13. Fitting 15 of the coupler is typically threaded to rigid conduit, the latter typically connected to a shutoff valve (not shown) which therefore creates a closed volume chamber 82 within the body member 12 which is closed at one end by the seating of coupler valve 60 at coupler valve seat 61. In the uncoupled position depicted, body member 12 is at its axially outward position with detent o-ring 78 received in the inner detent groove 80 of the body member, tending to retain the body member in such outward position. Such condition could be achieved by a manual movement of collar 50 if the body member 12 should be inadvertently positioned in its axially inward position. In the uncoupled condition locking balls 46 are received in recess 49 to allow entry of nipple 13. In this condition coupler valve 60 is urged against valve seat 61 solely by valve spring 72 by way of the guide 71 as well as by any residual fluid pressure within chamber 82 acting upon the coupler valve 60. In this condition as well shoulder 36 of piston 31 is in engagement with shoulder 24 of housing 11 between bores 19, 20 to provide a minimal volume condition for annular chamber 38.

In FIG. 2 coupler 10 is depicted in partially coupled condition with nipple 13 fully inserted into entrance bore 41 of the body member and with the body member 12 moved to the axially inward position with detent o-ring 78 now received in the outer groove 79 of the body member. Prior to reaching this condition, however, as nipple 13 is initially inserted, detent o-ring 78 retains the body member temporarily in the axially outward position until the nose portion 44 of the nipple enters the sealing ring 42 and the groove 48 of the nipple 13 is positioned to receive the locking balls 46. This helps to assure that a miscock does not occur whereby the coupler valve 60 is opened prior to a seal being achieved with the nose portion 44 of the nipple 13.

At such preliminary insertion point the cylindrical extension 52 of the nipple valve 51 engages coupler valve 60 to move the latter from seat 61 thereby allowing full insertion of the nipple 13 into the entrance bore 41. With continued entry of nipple 13, nipple valve 51 urges coupler valve 60 axially inwardly against the bias of support spring 72 until flow check pin 74 is first engaged, this condition occurring at the location when the edge of the control valve 60 is approximately at the location of the valve seat 61. This position also corresponds to the balance position depicted in FIG. 3 and to be described in greater detail hereinafter.

Continued inward movement of nipple 13 causes further inward movement of coupler valve 60 and compression of flow check spring 75 through the intermediacy of flow check pin 74, causing movement of the latter to an axially inward position. The spring 75 of the flow check mechanism 65 and spring 72 of the valve support are selected so that the combination provides a stronger spring force than that of nipple valve spring 57 to assure that nipple valve 51 is moved to an open position once hydraulic pressures are equalized within the couplers. One of the features of this invention is that coupling may be achieved even though nipple 13 is under pressure and it may be seen in FIG. 2, that the nipple 13 may be inserted sufficiently far to compress flow check spring 75 to achieve a large outwardly directed force upon coupler valve 60 and nipple valve 51 to tend to open the latter. When nipple valve 51 is cracked and the hydraulic pressure in nipple 13 equalized, flow check spring 75 will return flow check pin 74 and the control valve 60 to the position depicted in FIG. 3 where the axially outer edge of the control valve 60 is approximately in axial alignment with valve seat 61. Pin 74 is prevented from further axial outward movement by engagement of clip 76 with support 66 and may be slightly spaced from control valve 60 when in the position depicted in FIG. 3. In this balanced position, support spring 72 through the intermediary of valve guide 71 provides a bias upon control valve 60 to substantially match the bias provided upon nipple valve 51 by nipple valve spring 57 so as to position the two valves in a full open balanced condition.

Coupling of the nipple 13 to the body member 12 occurs substantially simultaneously with insertion of the nipple into the entrance bore 41. Detent o-ring 78 has retained the body member 12 in its axially outward position as seen in FIG. 1 until the nipple nose portion 44 has passed o-ring seal 42. Continued axial inward force upon the nipple 13 urges body member 12 to overcome the detent o-ring 78 and slide to the axially inner position camming the locking balls 46 into the peripheral groove 48 on the nipple 13 to retain the latter for movement with the body member. Inward movement continues until body member 12 engages shoulder 22 of the housing 11 with o-ring 78 being received in the outer groove 79 in the body member.

During such initial movement coupler valve 60 may be seated against valve seat 61 or a seal is achieved between nipple nose portion 44 and nipple seal 42 forming a trapped volume chamber 82 primarily defined by bore 62 of body member 12. To prevent a hydraulic lock condition accommodation must be made for change in the volume of chamber 82 as body member 12 is moved axially inwardly and this is provided by chamber 38 which is in fluid communication with inner chamber 82 by means of radial port 85 in body member 12. The dimensions of the housing 11 at bores 18 and 20 and at the outer surface of the tubular member 26 are selected so that the area sealed by o-ring 32 is equal to the difference in areas sealed by o-rings 40 and 39 so that a volume is defined in annular chamber 38 which changes in volume as does chamber 82. This allows body member 12 freedom to move between its axially outward and inward positions during the coupling operation. By selection of these effective areas for the o-ring seals 32, 39, 40 an effective force balance is also provided upon body member 12 so that no net substantial force is acting thereon once a control valve is opened and the coupling is pressurized. It would be possible as well to select appropriate areas for sealing by the o-rings so that a net axial inward force is developed upon body member 12 to tend to retain same within the housing 11, necessitating only that such force be overcome when it is desired to uncouple nipple 13 from the coupler 10.

When in fully coupled condition as depicted in FIG. 3 with the nipple valve 51 and coupler valve 60 in balanced position, it occasionally occurs that flow surges will be received from the implement side tending to move the nipple valve 51 to a closed position. Should this occur a fluid lock condition would prevent further hydraulic flow through the coupler. However, this is prevented in that the coupler valve 60 will be moved into engagement with the flow check pin 74 to compress flow check spring 75. As noted, the rate of flow check spring 75 is selected to be sufficiently high to prevent substantial axial inward movement of the control valve 60 thereby preventing complete closure of the nipple valve 51. Similarly cross pin 58 is provided in nipple valve 51 to prevent excess outward movement of coupler valve 60 into engagement with its valve seat 61, thereby preventing flow checking of the control valve 60.

Particularly with couplers utilized with agricultural instruments it is necessary that a breakaway type of uncoupling be provided in which uncoupling is automatically effected by an outward force directed to nipple 13. Such outward force is resisted initially by detent mechanism 78, 79. However, once this is overcome body member 12 will move to the axially outward position on urging from nipple 13 by way of the locking mechanism 45 until a position is reached where the locking balls 46 may enter the recess 49 to provide complete release of nipple 13. With separation of nipple 13 from body member 12 the respective valves 51, 60 of the nipple and coupler will be returned to their valve closed positions by means of the bias springs 57, 72 rendering the respective conduits in closed condition.

What is claimed is:

1. A rigid mount coupler, comprising
   a female member having
   a housing and
   a body member within said housing supported for axial movement relative to said housing between an inner and outer position, said body member having an axially inner end and an axially outer end,
   a nipple received in said body member at said axially outer end, said nipple having a nipple valve and seat therein and spring bias means resiliently urging said nipple valve to a normally closed position, said nipple being engageable with said body member for moving said body member therewith solely with axial movement to said inner position and to said outer position,
   locking means on said body member holding said nipple at said inner position and releasing said nipple at said outer position,
   a valve seat in said body member,
   a coupler valve,
   means resiliently supporting said coupler valve in said body member for axial movement toward and away from said valve seat, said coupler valve being engageable by said nipple valve, said support means having a spring providing a force substantially the same as the force of said nipple valve spring bias means to balance both said valves at open positions relative to said respective valve seats,
   flow check means resiliently supported in said body member and engageable with said coupler valve for resisting movement of said coupler valve to a more open position than said balanced open position, thereby to also resist movement of said nipple valve toward said nipple valve seat,
   first seal means between said body member and said housing forming an inner chamber within said body, second and third seal means between said body and said housing forming an outer chamber between said body and said housing, a port in said body providing fluid communication between said inner and outer chambers, said chambers varying in volume as said body is moved relative to said housing and being dimensioned so that changes in volume of said inner and outer chambers are substantially equal and opposite, so that fluid displaced from one said chamber may be accommodated in the other said chamber, by way of said port, and detent means between said body and said housing for releasably securing said body member in said outer and inner positions, thereby to assure respectively that said nipple is properly engaged in said body member and to resist initial outward movement of said body member, said detent means comprising an expandable ring and annular groove arrangement between said housing and said body members, said coupler valve resilient support means comprising a support mounted in said body member for movement therewith, a bore in said support for receiving said coupler valve for axial movement, a counterbore in said support, and a tubular retainer received in said counterbore for axial movement, said spring being in said bore urging said retainer against said coupler valve and toward said coupler valve seat, said flow check means comprising a pin received for axially slidable movement in a second counterbore in said support, a second spring urging said pin outwardly into engagement with said coupler valve and a stop for preventing outward movement of said pin at a predetermined location.

2. The coupler set forth in claim 1 wherein said pin engages said coupler valve at a location where said coupler valve and said nipple valve are at balanced valve open positions, thereby to resist further inward valve opening movement of said coupler valve.

3. The coupler set forth in claim 2 wherein said coupler valve is a ball valve slidable in said bore of said support and said coupler valve seat lies in a plane transverse to the longitudinal axis of said coupler.

* * * * *